United States Patent
Mucci (10) Patent No.: US 11,157,021 B2
(45) Date of Patent: Oct. 26, 2021

(54) DRONE TOURS IN SECURITY SYSTEMS

(71) Applicant: TYCO FIRE & SECURITY GMBH, Neuhausen am Rheinfall (CH)

(72) Inventor: Anthony Mucci, Wellington, FL (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 4 days.

(21) Appl. No.: 14/516,651

(22) Filed: Oct. 17, 2014

(65) Prior Publication Data
US 2016/0116914 A1 Apr. 28, 2016

(51) Int. Cl.
| | | |
|---|---|---|
| G05D 1/10 | (2006.01) | |
| G08B 13/196 | (2006.01) | |
| B64C 39/02 | (2006.01) | |
| G05D 1/00 | (2006.01) | |
| G08G 5/00 | (2006.01) | |

(52) U.S. Cl.
CPC ........... G05D 1/101 (2013.01); B64C 39/024 (2013.01); G05D 1/0011 (2013.01); G05D 1/0088 (2013.01); G08B 13/1965 (2013.01); G08B 13/19604 (2013.01); G08G 5/003 (2013.01); B64C 2201/127 (2013.01); B64C 2201/146 (2013.01)

(58) Field of Classification Search
None
See application file for complete search history.

(56) References Cited

U.S. PATENT DOCUMENTS

| | | | | |
|---|---|---|---|---|
| 8,554,478 B2* | 10/2013 | Hartman | ............... | G01S 17/023 180/167 |
| 2004/0193334 A1* | 9/2004 | Carlsson | .............. | G05D 1/0022 701/9 |
| 2006/0235584 A1* | 10/2006 | Fregene | ................. | G05D 1/104 701/23 |
| 2008/0144884 A1 | 6/2008 | Habibi | | |
| 2009/0265193 A1* | 10/2009 | Collins | .............. | G06Q 30/0185 705/4 |
| 2010/0019726 A1* | 1/2010 | Kumar | ................. | B60L 3/0046 320/125 |
| 2010/0042269 A1 | 2/2010 | Kokkeby et al. | | |
| 2010/0100269 A1* | 4/2010 | Ekhaguere | ............. | G05D 1/101 701/26 |

(Continued)

OTHER PUBLICATIONS

International Search Report and Written Opinion, PCT/EP2015/074008.

(Continued)

*Primary Examiner* — Nicholas K Wiltey
(74) *Attorney, Agent, or Firm* — Foley & Lardner LLP (57) ABSTRACT

An unmanned aerial vehicle is described and includes a computer carried by the unmanned aerial vehicle to control flight of the unmanned aerial vehicle and at least one sensor. The unmanned aerial vehicle is caused to fly a specific pattern within a facility, receive sensor data from a sensor carried by the vehicle, apply processing to the sensor data to detect an unacceptable level of detected feature differences in features contained in the sensor data, determine a new flight instruction for the vehicle based on the processing; and send the new flight instruction for the vehicle to a system for controlling flight of the vehicle.

14 Claims, 5 Drawing Sheets

(56) References Cited

U.S. PATENT DOCUMENTS

| | | | | |
|---|---|---|---|---|
| 2012/0269633 A1* | 10/2012 | Danforth | ............... | F02K 9/00 |
| | | | | 416/170 R |
| 2014/0027131 A1* | 1/2014 | Kawiecki | ............ | G08B 17/005 |
| | | | | 169/45 |
| 2014/0032034 A1* | 1/2014 | Raptopoulos | ........ | G08G 5/0069 |
| | | | | 701/25 |
| 2014/0316616 A1* | 10/2014 | Kugelmass | ............ | G05D 1/101 |
| | | | | 701/8 |
| 2015/0293994 A1* | 10/2015 | Kelly | ..................... | H04L 41/12 |
| | | | | 707/740 |
| 2016/0035224 A1* | 2/2016 | Yang | ................. | H04B 7/18506 |
| | | | | 701/23 |
| 2016/0042637 A1* | 2/2016 | Cahill | ................... | G08B 25/10 |
| | | | | 701/3 |
| 2018/0108260 A1* | 4/2018 | Kuhara | ................ | G01C 21/20 |

OTHER PUBLICATIONS

EPO Examination Report for European Application No. EP 15755018.7 dated Jul. 9, 2019, 6 pages.
Office Action on EP 15784001.8, dated Mar. 15, 2021, 6 pages

* cited by examiner

DRONE TOURS IN SECURITY SYSTEMS

BACKGROUND

This description relates to operation of security systems in particular surveillance systems.

Conventionally, commercial surveillance systems were those that were manned by humans that regularly traversed a facility checking in at guard stations and making observations. Surveillance systems progressed to include closed circuit television monitoring, and more recently integrated systems have been developed to include video cameras installed at strategic locations in a facility. These video cameras are in communication with a centralized remote monitoring facility and operators at the facility visually sweep the facility from the monitoring center. These tours are scripted and timed at a user request. Upon discovery of suspicious activity, the operator can engage in a custom designed response plan.

One surveillance solution has been employed by the military by the use of surveillance unmanned aerial vehicles, commonly referred to as drones. Military surveillance drones are capable of flying over substantial areas such that video surveillance can be achieved. Military surveillance drones are very expensive and address surveillance of very large outdoor areas. However, these drones are not practical for businesses that want to maintain security at a single location or small group of locations such as a warehouse or a manufacturing facility.

SUMMARY

The problem with conventional commercial types of surveillance systems is that the systems require a significant investment in video cameras to cover all critical areas are prone to missing conditions. For example, video surveillance systems covering large areas or space require many cameras, large amount of media storage (local DVRs or remote hosting), video management tools to investigate the accumulated information from all the cameras, and analytics for each of the many streaming video channels from the many cameras. In most cases, licensing to operate the analytics is on a per channel basis. This applies to both systems that are completely wired and those that use some degree of wireless technology.

On the other hand, military surveillance drones are very expensive and address surveillance of very large outdoor areas. Commercial applications require a much more cost efficient solution. Limitations of conventional commercial systems are significant causes of missed conditions, as well as false alarms that can cost alarm monitoring companies, building owners, security professionals and/or police departments significant amounts of money and wasted time that would otherwise be spent on real intrusion situations.

According to an aspect, a method includes programing a computer that assists in controlling flight of a drone to cause the drone to fly a specific pattern within a facility, receive sensor data from a sensor carried by the drone, apply processing to the sensor data to detect an unacceptable level of detected feature differences in features contained in the sensor data, determine a new flight instruction for the drone based on the processing and sending the new flight instruction for the drone to a system for controlling flight of the drone.

The following are some of the features within this aspect.

The method cause the drone to make an initial tour of a facility, prior to scheduled tours of the facility. The method further includes retrieving from a database data captured from a previous day's tour; and processing the sensor data captured by the initial tour to compare with sensor data captured from the previous day's tour to determine whether the data captured by the initial tour is acceptable for a baseline. The method further includes causing the drone to check in at pre-programmed locations within the facility to indicate its presence. The method further includes causing the drone to return to a pre-programmed location within the facility to indicate its presence, transmitting by the drone to a server computer, records that detail time, identity of the station and identity of the drone, with the location being a waypoint that includes a device that sends a signal to the drone to identify to the drone, the waypoint as a home station for the drone, and recharging the drone at the home station. The method further includes causing the drone to check in at pre-programmed locations within the facility to indicate its presence, with checking in transmitting to a server computer, records that detail time, identity of the station and identity of the drone. The system for controlling flight of the drone includes the computer, with the computer being carried by the drone. The system for controlling flight of the drone includes the computer, with the computer being remote from the drone.

According to an aspect, an unmanned aerial vehicle includes a computer carried by the unmanned aerial vehicle to control flight of the unmanned aerial vehicle, at least one sensor carried by the unmanned aerial vehicle, with the computer configured to cause the unmanned vehicle to fly to fly a specific pattern within a facility, receive sensor data from a sensor carried by the drone, apply processing to the sensor data to detect an unacceptable level of detected feature differences in features contained in the sensor data, determine a new flight instruction for the drone based on the processing, and send the new flight instruction for the drone to a system for controlling flight of the drone.

Aspects of the invention include computer program products tangible stored on a physical, hardware storage device or devices or systems as well as computer implemented methods.

The above techniques can include additional features and may include one or more of the following advantages.

The use of drones and analysis information provided by the drones would likely significantly reduce the rate of false alarms while providing more robust surveillance monitoring at lower costs than many current techniques. Reducing false alarms would likely minimize costs borne by alarm monitoring companies, building owners, and security professionals, and better utilize police department resources to handle real intrusion situations.

The details of one or more embodiments of the invention are set forth in the accompanying drawings and the description below. Other features, objects, and advantages of the invention is apparent from the description and drawings, and from the claims.

DETAILED DESCRIPTION

Figure 1:
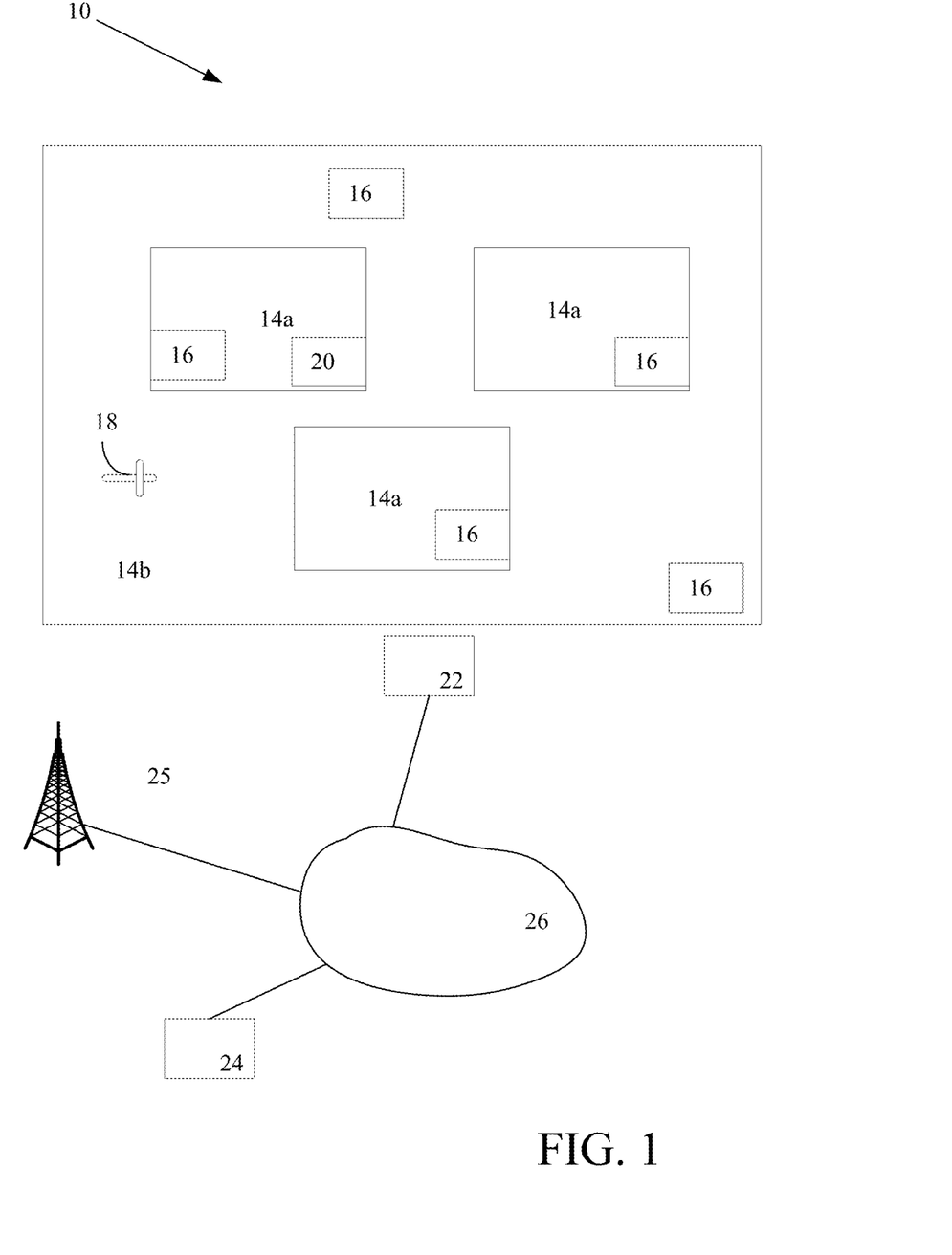
FIG. 1 is a schematic diagram of an example surveillance system at a facility.

Referring now to FIG. 1, an example application 10 of a surveillance system 12 installed at a facility 14 is shown. In this example, the facility 14 is, e.g., a commercial, industrial, facility, with interior areas, 14a (buildings) and exterior areas 14b that are subject to surveillance. The buildings 14a can be of any configuration, wide open spaces such as a warehouse, to compartmentalized facilities such as labs/ offices. The surveillance system 12 includes one or more UAV or drone stations 16 (for example, HATP's, discussed below). A UAV (unmanned aerial vehicle) commonly known as a drone is a remotely piloted airborne vehicle, i.e., an aircraft that does not have a human pilot aboard. However, a human controls the flight of the drone remotely or in some applications the flight of the drone is controlled autonomously by onboard computers.

The drone stations 16 provide bases for one or more of the plural drones 18. The system also includes a server 20 that is in communication with the drones 18 and a gateway 22 to send data to and receive data from a remote, central monitoring station 24 (also referred to as central monitoring center) via one or more data or communication networks 26 (only one shown), such as the Internet; the phone system or cellular communication system 25 being examples of others. The server 20 receives signals from the plural drones. These signals include video signals from onboard cameras as well as location information.

Figure 1A:
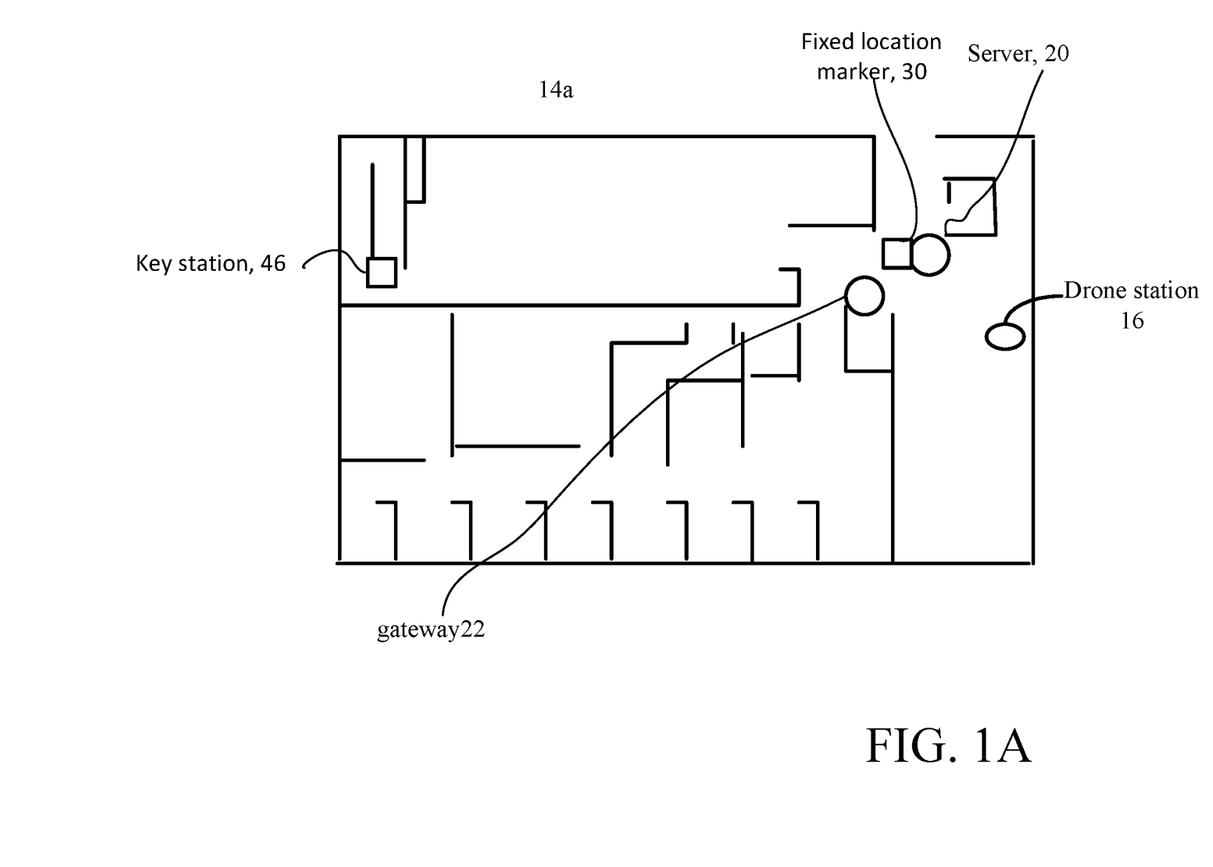
FIG. 1A is a schematic of a typical structure.

Referring to FIG. 1A an exemplary floor plan for an exemplary one of the buildings 14a is shown in some detail, including hallways, and offices with various doorways, all shown schematically but not with reference numbers. Also shown are fixed location markers 30 that can be any one of a number of technologies, e.g., the waypoints discussed below, the server 20, gateway 22 and drone station 16.

The drones can carry several types of sensor/detectors. One type of sensor is a video camera that sends video data to the server 20. Examples of other types of sensors 28b include microphones to send audio data. The sensors 28 may communicate wirelessly to the server 20 or can communicate through an on-board computer on the drone. In general, sensors 28a capture audio and video and send signals to the server 20. Based on the information received from the sensors 28a, the server 20 determines whether to trigger and/or send alarm messages to the monitoring station 18. An operator at the remote control station controls actions of the drone.

The data or communication network 24 may include any combination of wired and wireless links capable of carrying packet and/or switched traffic, and may span multiple carriers, and a wide geography. In one embodiment, the data network 24 may simply be the public Internet. In another embodiment, the data network 24 may include one or more wireless links, and may include a wireless data network, e.g., with tower 25 such as a 2G, 3G, 4G or LTE cellular data network. Further network components, such as access points, routers, switches, DSL modems, and the like possibly interconnecting the server 20 with the data network 24 are not illustrated.

Figure 2:
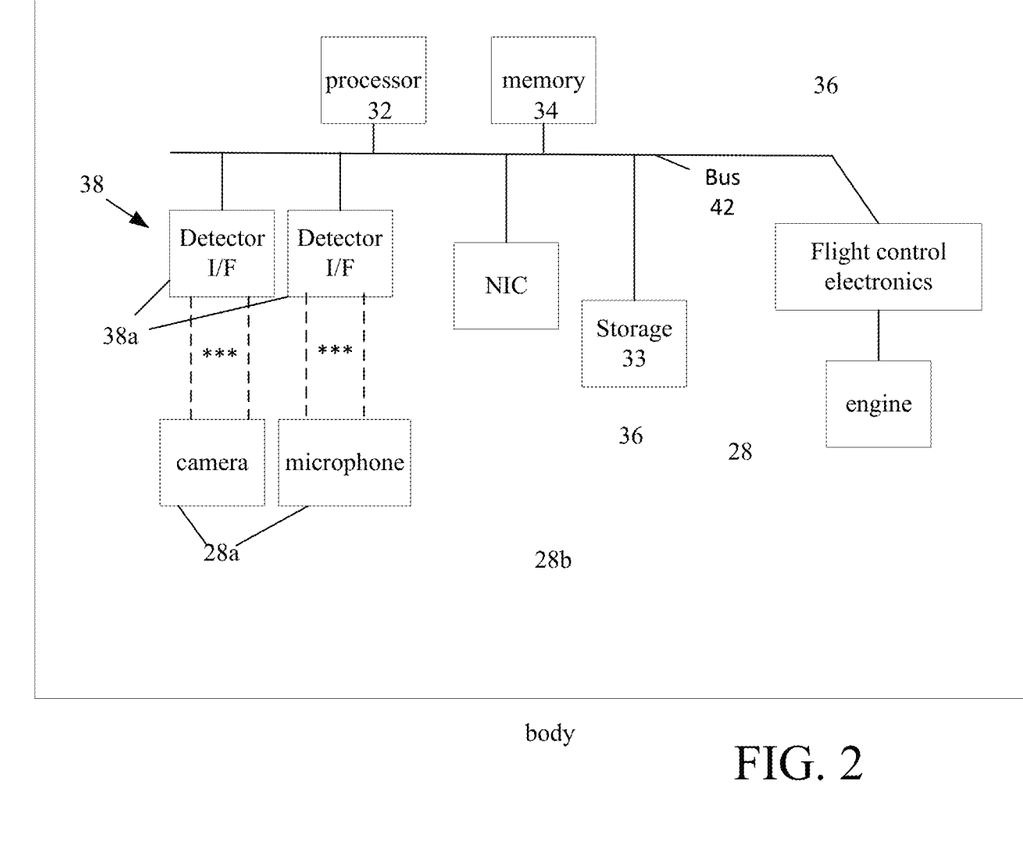
FIG. 2 is a block diagram of a surveillance system.

Referring now to FIG. 2, details on an exemplary drone 18 are shown. The drone 18 includes processor 32 and memory 34, and storage 33 and a wireless network interface card (NIC) 36 all coupled via a bus 42. The drone 18 also includes one or more sensors and one or more interfaces 38 to receive sensor data from the sensors 28. Illustrated for explanatory purpose are camera and microphone sensors 28 and interfaces 38 for those sensors. The sensors 28 are coupled to the interfaces either via hard wiring or wirelessly. The drone 18 also includes flight control electronics and one or more electric motors to control one or more propellers. The drone includes a body that can be either that of a plane or a helicopter. The drone flight control electronics are response to control signals received by the processor via the wireless interface card that allow a remotely positioned operator to control flight of the drone and control the camera and microphone on the drone.

When inside of a facility, the drone is guided through corridors etc. to reach the location of interest either by an operator or in an autonomous manner by following a programmed flight pattern and applying guidance processing to allow the drone to follow the pattern, i.e., without an operator at security monitoring station guiding all of the drone's movements.

Figure 3:
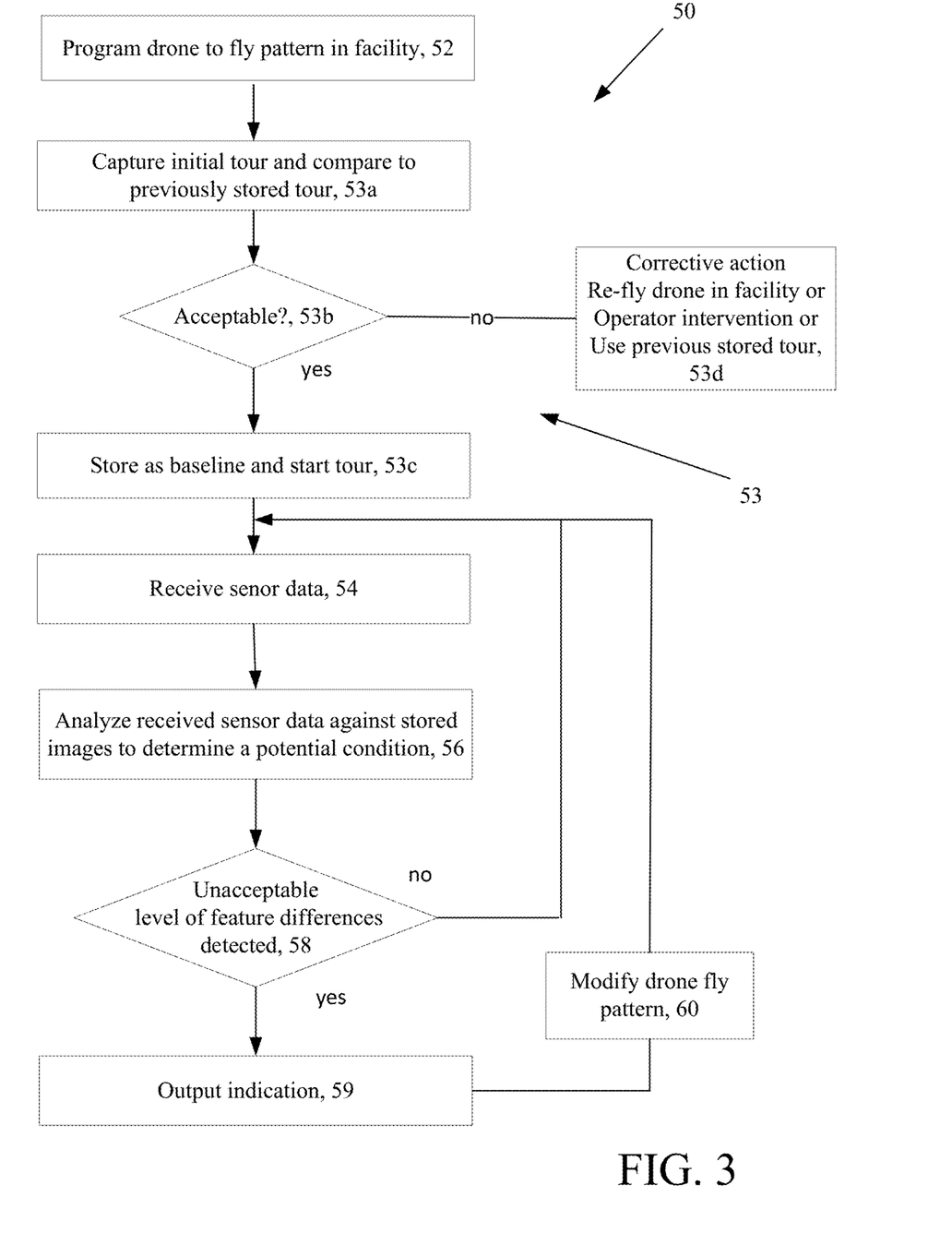
FIG. 3 is a flow diagram showing an example process for determining surveillance mapping.

Referring now to FIG. 3, intelligent processing 50 by the server 20 system and/or the central monitoring station is shown. The drone is programmed 52 to fly a pattern around the inside and/or outside perimeter of the building providing sensor data that can be in various forms, as set out below. In some implementations, the sensor data is live video back to the security monitoring center where the video is stored and viewed. In some implementations, the drone can make an initial tour 53 to capture sensor data, e.g., video at an initial round 53a. This data is stored and can be compared against a previously stored version 53b band if acceptable, becomes a baseline for subsequent data that will be captured by the drone 53c.

The drone is launched, and as the drone flies the programmed pattern it collects such sensor data. The server 20 system and/or the central monitoring station receives 54 signals from various sensors e.g., a camera, a microphone, etc. on the drones. The server 20 applies 56 analytics to the sensor data, e.g., the video, by comparing for instance, current images captured by the drone at a particular location to stored images previously taken at the same location to detect features in the current images that are different than expected based on the stored images.

In the case where an unacceptable level of feature differences is detected that could be an indication of detected movement of a person or thing, within the field of view of the images, the analytics outputs an indication. In the case where the server performs the processing, the server 20 notifies the monitoring station or where the monitor station 20 is performing the processing, monitoring station alerts the operator. The processing upon detection of an unacceptable lever of feature differences, modifies 60 the drone fly pattern. When the drone is in autonomous flying mode, the modified pattern can be accomplished by the server 20 producing a new fly pattern taking into consideration results of analytics processing, and reprogramming the drone with the new fly pattern. Alternatively, the server 20 can cause the flight control of the drone transferred control to an operator. When the drone is initially under operator control, the analytics produce messages sent to a display (not shown) within view of the operator to assist the operator in guiding the drone and thus apply a new fly pattern. The new fly pattern can be varied including causing the drone to hover about that location providing continuous video surveillance back to the monitoring station or to follow a path determined by the analytics processing.

If intrusion is detected by other sensors within a facility, such as a window being opened or a glass break detector or contact switch being asserted on an intrusion detection system, the drone can be immediately guided by the operator to fly to that location providing similar surveillance until the incident is evaluated and handled.

Guidance within or outside of a building can be accomplished by several techniques.

For example, when outside of a building, guidance can be accomplished by global position system (GPS) tracking. Alternative techniques include an operator at the monitoring facility manually flying the drone to a specific location or having the drone hover at the location. Within a building guidance can be accomplished by feature recognition to follow a preprogrammed map of the interior of the building. Another type of navigation is a map based type navigation that includes a database that stores images of landmarks, descriptions of items and navigation instructions. A third type of navigation is by r.f. (radio frequency) beacons being deployed within the facility, sending out r.f signals that a guidance system on board the drone captures and uses to apply a triangulation algorithm to figure out current location.

Within a building feature several guidance techniques whether r.f.-based, sonar-based or optical-based, can be used.

Crash Avoidance:

The drone has crash avoidance systems that are used during tours to detect and record any physical objects that disrupt the ability of the drone to follow a tour route plan. Many drones now come supplied with crash avoidance systems that determine proximity to nearby objects and are used with drone navigation to navigate around the object and return to a preprogrammed path or route.

When establishing a tour route plan (TRP), programmable waypoints placed, e.g., at location points, objects, locations, etc. along a path determined by the plan that a drone will fly to in sequential order while using crash avoidance capability to move along safely and intact. The number of programmable waypoints is limited by the amount of onboard memory allocated for waypoints. If TRP waypoints are stored on a server and delivered to the drone during flight, the number of waypoints is limited by the amount of server memory and processing power allocated for waypoints. The waypoints are small devices that are programmable and include an RF transmitter devices, e.g., RFID or low power RF transmitters that continually broadcast its identity and/or placement and which are placed at locations where the asset being protected is located and at all permitted points of entry to the protected area.

One type of waypoint is an Asset to Protect (ATP) waypoint. These waypoints are a specific type of waypoint that is placed near the item or area of high value and susceptible to attack or theft. Another type of waypoint is Home Asset to Protect (HATP) waypoint. This is a specific type of waypoint. This waypoint itself is a high value item, and susceptible to attack or theft. It is the home for the drone where the drone docs, recharges, and exchanges data with the server(s) the drone is associated with. The drone continually calculates how much power the drone has for flying, how far away the drone is from a HATP, and thus can calculate when to return to an HATP for recharging. Another type of waypoint is a Perimeter Point to Protect (PPP) waypoint. This is a specific type of waypoint that are placed along perimeters along a route. This waypoint is an item or area of high value and susceptible to attack or theft.

The Tour Route Plan (TRP) is a predetermine flight path that is programmed into the drone, and server that contains the tour service and awareness of the desired environment's condition. The flight path is established by the use of the aforementioned waypoints. The drone recognizes the existence of the waypoints and uses the tour service to calculate the shortest path to and between waypoints. Using crash avoidance while traveling to a waypoint, the tour plan is established, recorded, and presented to an operator/user via a graphical user interface. The operator defines a tour schedule through the user interface. When flying the tour, the drone uses crash avoidance to determine and report any deviations from the already determine tour plan. The drone captures images of the deviation and reports them as troubles during the premises disarmed period or alarm during the premises armed period.

A Triggered Alarm Response (TAR) is provided by the drone and server that contain the tour service programmed with the awareness of the desired (normal non-alarm/trouble) condition of the environment is interfaced to other security systems and/or services, i.e. Intrusion Detection System, Access Control, and Video Surveillance. The interface can be done through a predefined Application Programming Interface (API) using Web Services, XML, or proprietary formats. Through this interface and by input of the operator/user via the graphical user interface, the Tour Route Plan relative to the location of the waypoints knows the location of the points of protection from the other connected alarm systems. On any alarm or trouble that is initiated by an interconnected security system, the drone uses the TRP and crash avoidance to fly to the waypoint closest to the reported point of protection that triggered the alarm or trouble to capture and transmit to the Home Asset to Protect (HATP) point(s) video images, sound, and temperature. This data is fed to a TRP service analytics engine for comparison to the normal non-alarm/trouble condition, and relayed to the command center and/or monitoring center.

More specifically, the drone navigates by the above mentioned waypoints processing captured signals from the various waypoints to recognize its current position (e.g. stairs, exits, doors, corridors, etc.) within a facility. The drone has stored the tour plan that takes into consideration the relevant building or environment. Having this information, the drone correlates captures signals to features in the tour plan. By correlating the captured signals to the features in the tour plan, the drone can determine its current waypoint, is provided information on that waypoint, and can navigate to a subsequent waypoint based on the tour plan. The drone may incorporate the functionality of a compass to assist in navigation. In some implementations, the processing, rather than be performed by the drone, is performed by the server and the server receives the signals, processes the signals against the tour plan and the server sends navigation instructions to the drone to control flight of the drone.

A drone tour is essentially a navigation map structure that is produced and includes paths between a starting waypoint and an ending waypoint. The navigation map is stored as a structure such as a graph data structure that includes a set of nodes and a set of edges that establish relationships (connections) between the nodes. A graph g is defined as follows: g=(V, E), where V is a finite, non-empty set of vertices and E is a set of edges (links between pairs of vertices). When the edges in a graph have no direction, the graph is called undirected, otherwise it is called directed. Information may be associated with each node and edge of the graph. Each location or landmark corresponds to a waypoint and is represented as a node or vertex of the graph, and each description or distance between two waypoints is represented as an edge or link between the nodes. Associated with each edge is information that is in the form of flight instructions that control how the drone navigates from one node to the next node, e.g., by including data on engine speed and direction.

The edges correspond to relationships between the waypoints. Each edge has information about connectedness to other waypoints and information about proximity of waypoints. Since each node generally has one or more edges that connect to one or more nodes, a description of the relationship between nodes, such as navigation instructions for the flight electronics are obtained by accessing the data structure that stores the information defining the relationships among the waypoints.

The drone, the server or the central monitor station can perform, part or all of the processing in FIG. 3.

The system includes a charging station, i.e., the Home Asset to Protect (HATP) waypoint where drones land to recharge batteries as needed. The drones are small, inexpensive devices that are programmed to fly a predetermined pattern or to specific locations of interest within a building providing live video back to a security monitoring center.

Figure 4:
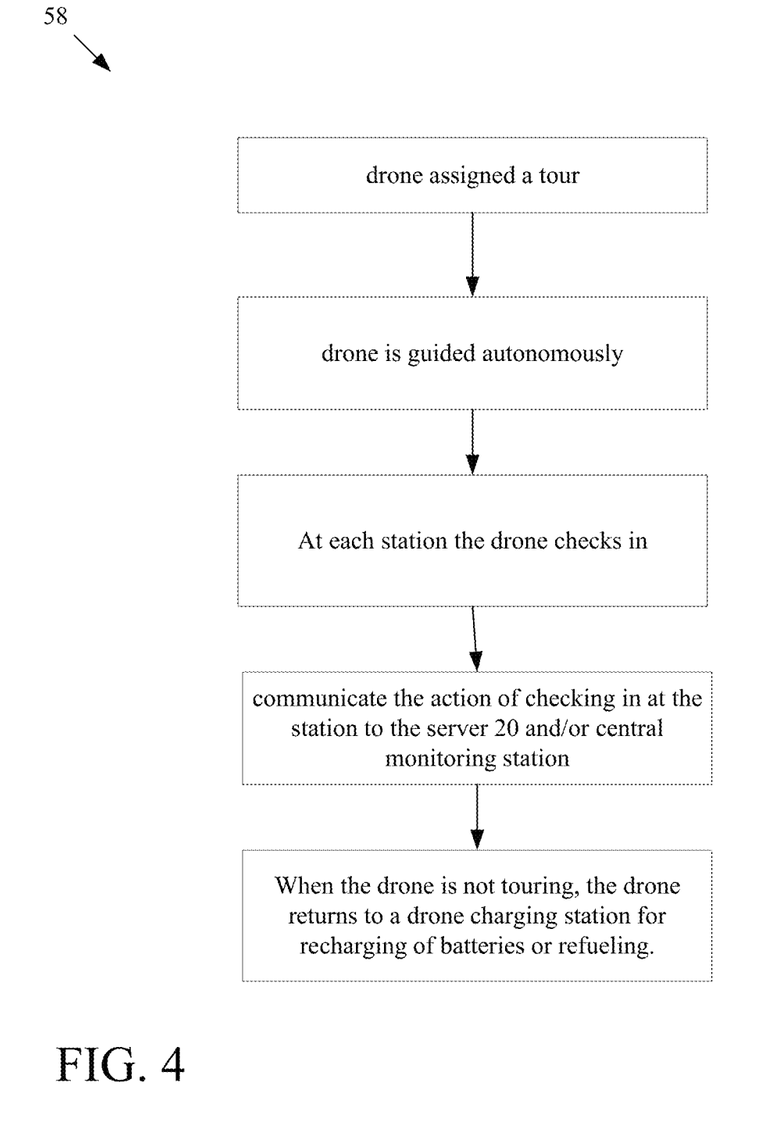
FIG. 4 is a flow diagram of an analysis process.

Referring now to FIG. 4, processing in the system 10 includes a drone being assigned a tour. The drone is assigned a tour that is a pre-program flight about a facility, as discussed above. The drone is guided as discussed above. The tour is a defined flight path interconnecting a series of stations, i.e., waypoints within or outside of a facility. At each waypoint the drone checks in. Checking in at a waypoint can involve several different mechanisms. In one mechanism the drone receives the signal being transmitted by the waypoint, and either stores this signal in memory and/or transmits it to the server, such as when the drone returns to a charging station. Alternatively, the drone can send a low power, signal over a relatively short distance to a detector that is associated with the waypoint and that can be forwarded to the server. In either event the waypoints visited are communicated to the server 20 and/or central monitoring station. The drone will continually make the rounds of this tour or can be programmed to conduct another tour. When the drone is not touring, the drone returns to a drone charging station for recharging of its batteries, or otherwise refueling. Alternatively, the drone receives a signal to return to base. The signal can originate either from the operator (monitoring station) or the server 20, an authorized client device (not shown) or the drone 18 itself, as the drone could be monitoring its fuel supply or level of remaining battery charge. In the latter situations of the signal originating from the server 20 or authorized client device or the drone 18 itself, one of those devices would send a signal back to the operator (monitoring station) to indicate that the drone 18 is returning to base 66 to allow another drone to be launched.

Drone Characteristics

Drones employed herein are selected according to the type and nature of the surveillance. For example, when the drones are employed to hover, a helicopter type drone might be preferable to an airplane type drone. In addition, when deployed outdoors of the facility, the drones in general can be relatively large in comparison to those employed inside a building within the facility. Moreover, a drone employed within a building that has wide open spaces can be in general larger than one employed in a building that has many rooms and corridors. Thus, a typical wing span for a drone outside can be 1 to 5 feet, whereas inside it would likely be less than 1 foot. In addition, when used exclusively outside the drone can be powered electrically, e.g., fuel cell and/or batteries or a hydrocarbon, e.g., gas or gasoline engine, whereas inside the drone should be powered electrically, e.g., fuel cell and/or batteries. These are however general considerations and specific applications would govern actual implementations.

Various sensors can be carried by the drone, thus sensors include microphones to sense sound, and cameras to capture images and/or video. However, other sensors can include sensors to capture motion, vibration, pressure, heat, and so forth, in an appropriate combination to detect a true condition in a facility.

The memory 34 stores program instructions and data used by the processor. The memory 34 may be a suitable combination of random access memory and read-only memory, and may host suitable program instructions (e.g. firmware or operating software), and configuration and operating data and may be organized as a file system or otherwise. The program instructions stored in the memory may further store software components allowing network communications and establishment of connections to the data network.

Program instructions stored in the memory along with configuration data may control overall operation of drone.

An example monitoring station 18 can be a single physical monitoring station or center in FIG. 1. However, it could alternatively be formed of multiple monitoring centers/stations, each at a different physical location, and each in communication with the data network 24. The central monitoring station 18 includes one or more monitoring server(s) 82 each processing messages from the drones and/or user devices (not shown).

The monitoring server 82 may include a processor, a network interface and a memory (all not illustrated). The monitoring server 82 may physically take the form of a rack mounted card and may be in communication with one or more operator terminals (not shown). An example monitoring server 82 is a SURGARD™ SG-System III Virtual, or similar system.

The processor of each monitoring server 82 acts as a controller for each monitoring server 82, and is in communication with, and controls overall operation, of each server 82. The processor may include, or be in communication with the memory that stores processor executable instructions controlling the overall operation of the monitoring server 82. Suitable software enable each monitoring server 82 to receive alarms and cause appropriate actions to occur. Software may include a suitable Internet protocol (IP) stack and applications/clients.

Each monitoring server 82 of central monitoring station 18 may be associated with an IP address and port(s) by which it communicates with the control panels 16 and/or the user devices to handle alarm events, etc. The monitoring server address may be static, and thus always identify a particular one of monitoring server 32 to the intrusion detection panels. Alternatively, dynamic addresses could be used, and associated with static domain names, resolved through a domain name service. The network interface may be a conventional network interface that interfaces with the network 24 (FIG. 1) to receive incoming signals, and may for example take the form of an Ethernet network interface card (NIC).

Servers can be any of a variety of computing devices capable of receiving information, such as a server, a distributed computing system 10, a rack-mounted server and so forth. Server may be a single server or a group of servers that are at a same location or at different locations. Servers can receive information from client device user device via interfaces. Interfaces can be any type of interface capable of receiving information over a network, such as an Ethernet interface, a wireless networking interface, a fiber-optic networking interface, a modem, and so forth. Server also includes a processor and memory and a bus system including, for example, an information bus and a motherboard, can be used to establish and to control information communication between the components of server.

Processor may include one or more microprocessors. Generally, processor may include any appropriate processor and/or logic that is capable of receiving and storing information, and of communicating over a network (not shown). Memory can include a hard drive and a random access memory storage device, such as a dynamic random access memory computer readable hardware storage devices and media and other types of non-transitory storage devices.

Embodiments can be implemented in digital electronic circuitry, or in computer hardware, firmware, software, or in combinations thereof. Computer programs can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and information from a read-only memory and/or a random access memory. Generally, a computer will include one or more mass storage devices for storing information files; such devices include magnetic disks, such as internal hard disks and removable disks; magneto-optical disks; and optical disks. Hardware storage devices suitable for tangibly embodying computer program instructions and information include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. As an alternative, an employee could remotely fly the drone in a pre-determined pattern, and could deviate from that pattern depending on what is captured by the drone camera, providing a higher level of surveillance. Another type of crash avoidance systems e.g., navigation is recognition-based guidance accomplished by applying feature recognition to follow a preprogrammed map of the interior of the building. The map would be as a series of features extracted from images. The drone capture images during flight, applies feature recognition to the images and extracts those recognized features and compares recognized features to features in the map to adjust flight paths, as needed within the building. Other embodiments are within the scope of the following claims.

What is claimed is:

1. A method, comprising:
sending, by a computer that assists in controlling flight of a drone, to the drone, a first graph data structure defining a first specific flight route within a facility, the first graph data structure comprising a set of nodes corresponding to a first set of waypoints in the facility and a set of edges that define relationships between the nodes, the drone using the first set of waypoints in the facility to avoid first obstacles in the first specific flight route and to recharge a battery on the drone or refuel based on a remaining power of the battery or fuel supply;
receiving, by the computer, sensor data from a sensor device carried by the drone, the sensor data corresponding to a first location in the facility along the first specific flight route;
processing, by the computer, the sensor data to detect feature differences in the sensor data by comparing the sensor data to stored sensor data previously captured at the first location in the facility;
generating, by the computer and responsive to detecting the feature differences, a first alarm condition based at least in part on the detected feature differences;
receiving, by the computer, an indication of a second alarm condition from a security system of the facility, the second alarm corresponding to a second location in the facility;
determining, by the computer, a second, different flight route based on the first or second alarm condition;
sending, by the computer and to the drone, a second graph data structure defining the second, different flight route, the second graph data structure comprising a set of nodes corresponding to a second set of waypoints in the facility and a set of edges that define relationships between the nodes, the drone using the second set of waypoints to fly in the facility to avoid second obstacles in the second, different flight route and to recharge the battery on the drone or refuel based on the remaining power of the battery or fuel supply, wherein the drone is configured to fly to the second location in the facility if the second, different flight route is determined based on the second alarm condition;
causing, by the computer, the drone to check in at pre-programmed location stations associated one or more of the first or second set of waypoints within the facility to indicate its presence; and
receiving, by the computer and in response to the drone checking in at the pre-programmed location stations, records that detail time, identity of the pre-programmed stations, and identity of the drone.

2. The method of claim 1, wherein the first specific route is a scheduled tour, and the method further comprises:
causing the drone to make an initial tour of the facility;
receiving by the computer second sensor data collected by the sensor of the drone on the initial tour; and
processing by the computer the second sensor data to provide the stored sensor data, wherein the initial tour occurs prior to the scheduled tour and the scheduled tour is one of a plurality of scheduled tours of the facility.

3. The method of claim 2, further comprising:
retrieving from a database sensor data captured from a previous day's tour; and
processing the sensor data captured during the initial tour to detect feature differences by comparing the sensor data captured during the initial tour to the sensor data captured from the previous day's tour to determine a baseline for subsequent comparisons for subsequent tours of the plurality of scheduled tours.

4. The method of claim 1,
wherein the check in is performed by transmitting, by the drone and to a beacon associated with each of the pre-programmed locations, a low power signal.

5. The method of claim 1, further comprising:
causing the drone to return to one of the of pre-programmed location stations,
wherein each of the pre-programmed location stations include a device that sends a signal to the drone to identify a corresponding location station to the drone.

6. The method of claim 1 wherein the system for controlling flight of the drone includes the computer, with the computer being carried by the drone.

7. The method of claim 1 wherein the computer is a first computer, and system for controlling flight of the drone includes a second computer, with the first computer being a server system that is remote from the drone.

8. The method of claim 1, wherein the computer is a first computer and the system to apply feature recognition is a second computer system that is remote from the drone.

9. An unmanned aerial vehicle, comprising:
a body supporting one or more electric motors and one or more propellers, a computer to control flight of the unmanned aerial vehicle, and at least one sensor device carried by the unmanned aerial vehicle, with the computer configured to:
cause the unmanned aerial vehicle to fly a first specific flight route within a facility while using a first graph data structure corresponding to a first set of waypoints in the facility to avoid obstacles in the first specific flight route and to recharge a battery on the unmanned aerial vehicle or refuel based on a remaining power of the battery or fuel supply, wherein the unmanned aerial vehicle is configured to check-in at each of the first set of waypoints by transmitting a low power signal to a detector associated with each of the first set of waypoints;
receive sensor data from at least one sensor device carried by the unmanned aerial vehicle and corresponding to a first location in the facility along the first specific flight route;
send the sensor data to a remote system that is configured to:
apply feature detection processing to the sensor data to detect feature differences contained in the sensor data with respect to baseline data stored by a remote system, the baseline data associated with the first location;
generate, responsive to detecting a difference between features in the sensor data and the baseline, an alarm condition based at least in part on the detected feature differences;
receive an indication of a second alarm condition from a security system of the facility, the second alarm corresponding to a second location in the facility;
determine a second specific route that is a different flight route based on the first or the second alarm condition;
program the unmanned aerial vehicle with the second specific that is the different flight route;
control flight of the unmanned aerial vehicle over the second specific route that is the different flight route, using a second graph data structure corresponding to a second set of waypoints in the facility to avoid second obstacles in the second specific route, different flight route and to recharge the battery on the unmanned aerial vehicle or refuel based on the remaining power of the battery or fuel supply, wherein the unmanned aerial vehicle is configured to fly to the second location in the facility if the second specific route that is the different flight route is determined based on the second alarm condition, and wherein the unmanned aerial vehicle is configured to check-in at each of the second set of waypoints by transmitting a low power signal to a detector associated with each of the second set of waypoints; and
in response to the unmanned aerial vehicle checking in at a waypoint of the second set of waypoints, recording a time of the check in, an identity of waypoint, and identity of the unmanned aerial vehicle.

10. The unmanned aerial vehicle of claim 9, wherein the second, specific route includes flight instructions that include flight instructions to hover over an area.

11. The unmanned aerial vehicle of claim 9, further comprising:
outputting by the computer an indication of features differences to cause the drone to fly the second specific route.

12. The unmanned aerial vehicle of claim 9, wherein the first specific route is a scheduled tour.

13. The unmanned aerial vehicle of claim 12, further configured to:
cause the unmanned aerial vehicle to make an initial tour of the facility prior to the scheduled tour;
retrieve from a database sensor data captured during a previous day's tour; and
process the sensor data captured during the initial tour to detect feature differences by comparing the sensor data captured during the initial tour to the sensor data captured from the previous day's tour to determine a baseline.

14. The unmanned aerial vehicle of claim 9, wherein the system to apply feature recognition is the computer.

* * * * *